United States Patent Office 2,852,118
Patented Sept. 16, 1958

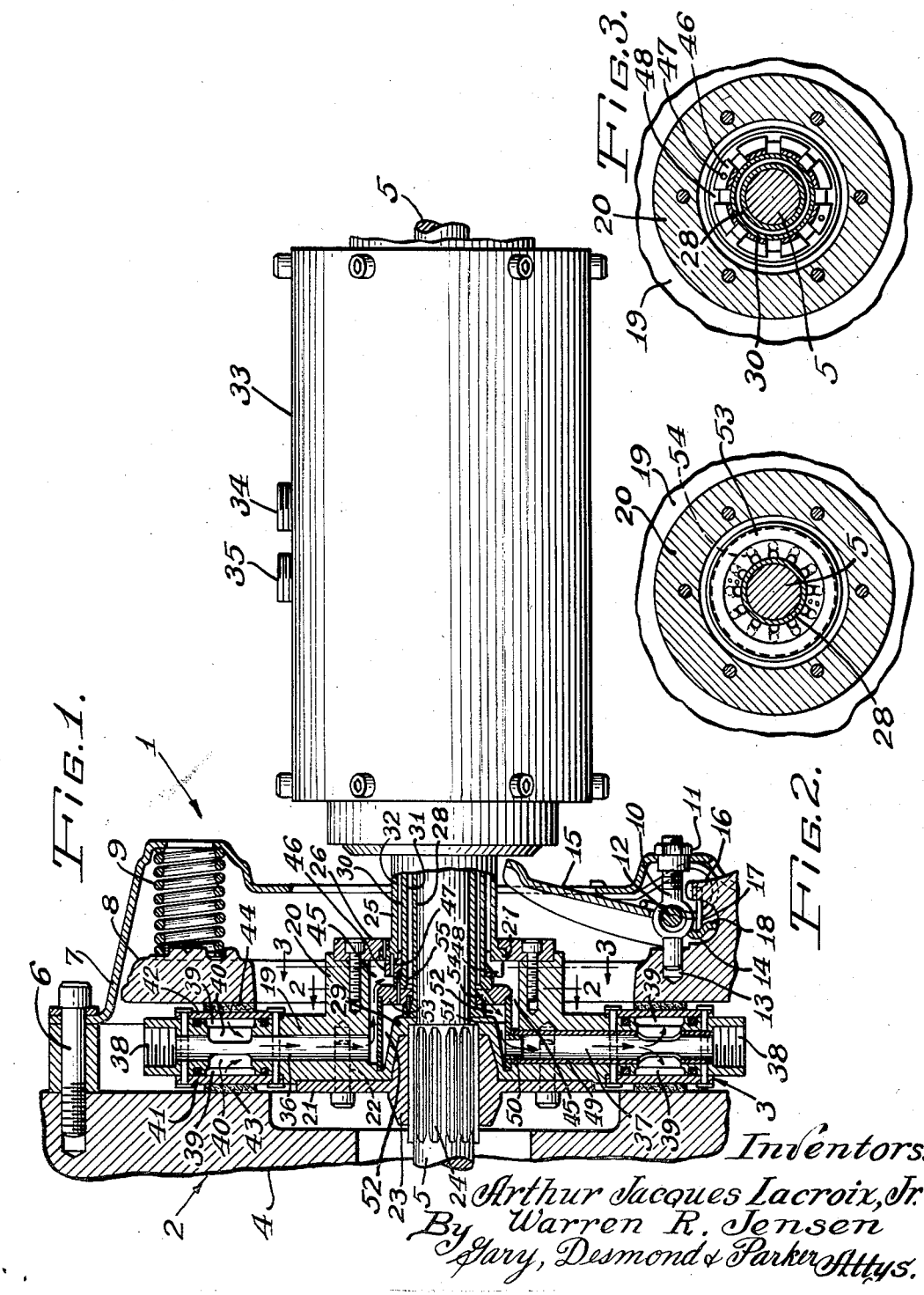

2,852,118

LIQUID COOLED CLUTCH

Arthur Jacques Lacroix, Jr., and Warren R. Jensen, Stratford, Conn., assignors to Raybestos-Manhattan, Inc., Passaic, N. J., a corporation of New Jersey Application October 17, 1956, Serial No. 616,469

5 Claims. (Cl. 192—113)

This invention relates to improvements in a liquid cooled clutch for power transmission purposes comprising a driving member and a driven member, one of said members being provided with cavities adjacent the friction engaging surfaces through which a cooling liquid may be circulated to remove heat developed at the friction engaging surfaces.

In clutches for power transmission purposes, at least two engaging members are employed, a driving member and a driven member. The two members usually comprise a clutch facing of relatively high frictional characteristics and a pressure plate which makes pressure contact with the clutch facing. The clutch facing may comprise either the driving member or the driven member and the pressure plate comprises either the driven member or the driving member, respectively.

In the normal use of the clutch, the driven member is usually stationary or at least initially moves at a slower speed than the driving member which is rotating. When engagement of the two members takes place, a degree of slippage occurs between the two members which generates heat at the engaging surfaces. When a clutch is overloaded slippage also takes place with the accompanying generation of heat. Heat is detrimental to the life of the engaging members and, hence, it is desirable that the heat caused by the slippage be transmitted away from the heat-generating surfaces as rapidly as possible.

The present invention contemplates a clutch wherein one of the members, preferably the member engageable with the friction facings, is cooled by a circulating liquid coolant whereby excess heat may be rapidly removed from the engaging surfaces. The cooled member may be either the driving member or the driven member, as desired.

The features, objects and advantages of the present invention will be more apparent from the accompanying drawing and following detailed description.

In the drawing,

Fig. 1 is a sectional view, partly in elevation, illustrating a clutch embodying the concepts of the present invention.

Fig. 2 is a detailed sectional view taken on line 2—2 of Fig. 1, and

Fig. 3 is a similar sectional view taken on line 3—3 of Fig. 1.

Referring in detail to the drawing, 1 indicates a power transmission clutch comprising a driving member 2 and a driven member 3. As will be clear, as the description proceeds, the members may be functionally reversed, that is, 3 may comprise the driving member and 2 the driven member, and the benefits of the present invention may still be secured. The driving member 3, for purposes of description may comprise a conventional flywheel, a portion of which is indicated at 4 in Fig. 1, and the driven member 3 may be mounted upon a driven shaft 5.

Rigidly secured to the flywheel 4 by means of screws 6, only one of which is shown, is a housing 7. An annular pressure plate 8 is positioned in the housing 7 an is adapted to rotate with the housing and flywheel as a unit. However, said pressure plate moves axially relative to the housing when the clutch is engaged and disengaged. Normally, the pressure plate 8 is urged toward the flywheel 4 by coil spring 9.

A bolt 10 is secured to housing 7 and may be adjusted inwardly and outwardly with respect to the housing by nut 11, an intermediate portion of the bolt being provided with an eye 12. The inner end of bolt 10 registers freely in hole 13 provided in pressure plate 8 whereby the pressure plate is rotated with the housing 7 when the clutch is disengaged. A pin 14 is positioned within eye 12, said pin being carried by clutch release plate 15. Pressure plate 8 carries a ledge 16 in which a pin 17 is positioned and the clutch release plate 15 carries a tail piece 18 which bears against the end of pin 17. The diameter of the eye 12 is greater than the diameter of pin 14 and, hence, when the clutch release plate is rocked about the eye as a pivot bearing, the pressure plate 8 may be moved outwardly relative to flywheel 4 against the compression of spring 9 to release the clutch.

The type of flywheel-pressure plate assembly hereinbefore described is conventional and per se does not comprise the present invention. However, of importance is, that the present invention may be conveniently used with conventional clutch parts.

The driven member 3 comprises a substantially circular plate 19 having a hub portion 20 which loosely embraces shaft 5. A driving disc 21 is secured to the plate 19 by screws or the like 22 and said disc is carried by a splined hub 23 which engages with splines 24 carried by shaft 5. Thus, the driving disc 21 and, hence, plate 19 is axially movable but non-rotatable upon shaft 5.

An outer tubular sleeve 25 embraces the shaft 5 and is secured to hub 20 by a locking collar 26 which engages a flange 27 carried on the end of the sleeve. An inner sleeve 28 also embraces shaft 5 and is disposed within the outer sleeve 25, the sleeve 28 terminating against portion 29 of the plate 19. An intermediate sleeve 30 also embraces shaft 5 and is disposed between the outer sleeve 25 and the inner sleeve 28. Thus, two separate annular compartments, in compartment 31 and outer compartment 32 are provided between the respective sleeves. For purposes of description the inner compartment 31 is considered the inlet compartment and the outer compartment 32 is considered the outlet compartment, but the function of said compartments may be reversed, if desired.

A packing drum 33 may circumscribe shaft 5 and sleeves 25, 28 and 30, said drum being stationary and having a liquid inlet pipe 34 and a liquid outlet pipe 35 which may be connected to a suitable source or circuit of liquid (not shown). For vehicular service, the inlet and outlet pipes may be connected to a suitable hydraulic circuit comprising a reservoir, a pump and a heat exchanger whereby a cooled liquid may be continuously fed to the clutch. However, in general, the inlet pipe may be connected to any source of coolant and pipe 35 may be connected to any convenient liquid discharge.

Within the packing drum 33 the inlet 34 may be connected to inlet compartment 31 and outlet may be similarly connected to outlet compartment 32 or vice versa, conventional sealing means (not shown) being employed to effect the connection between the stationary pipes 34 and 35 and the compartments defined by the movable sleeves 25, 28 and 30.

The circular plate 19 is provided with two diametrically opposite radial bores 36 and 37 which may open at their respective outer ends in threaded openings 38 through which the bores 36 and 37 may be drilled, the openings 38 being adapted to be closed by plugs (not shown) after the plate has been constructed. The plate 19 is also provided with a pair of opposite annular recesses 39 each of which opens to a respective face of the plate. A pair of opposite apertures 40 connect the recesses 39 to bore 36 and a similar pair of apertures connect the recesses 39 to the bore 37.

An annular ring 41 is secured to one face of plate 19 and a similar ring 42 is secured to the opposite face of the plate, said rings serving as closures for the recesses 39. A clutch facing 43 may be carried on flywheel 4 and a similar clutch facing 44 is carried on pressure plate 8, and said clutch facings being disposed opposite to the respective recesses 39 and preferably being of radial thickness equal to the radial dimensions of the mouths of the recesses. Thus, when liquid is circulated through the recesses, as will be hereinafter more fully described, the entire area of the clutch facings will bear against the liquid cooled surface of the rings 41 and 42. In addition, by proper regulation of liquid pressure in the apertures 39 the engaging pressure upon the clutch facings will balance or approximately balance the liquid pressure in recesses 39 and thus the rings 41 and 42 will be subjected to substantially balanced pressures on each side and the tendency for the rings to buckle will be reduced.

The bore 36 at its inner end communicates with an annular compartment 45. A ring 46 is secured to the end of outer conduit 25 by means of pins 47. The ring 46 is provided with a plurality of circumferentially spaced recesses 48 (Figs. 1 and 3) which communicate with the annular compartment 45 and also communicate with the annular outer compartment 32, that is, the outlet compartment.

The bore 37, that is, the inlet bore, is lined with a pipe 49 which communicates through a restricted nipple 50, carried by an annular division plate 51, with an annular inlet compartment 52. A ring 53 blocks compartment 52 from compartment 45 said ring being provided with a plurality of inclined circumferentially spaced bores 54 (Figs. 1 and 2). The bores 54 connect the inner annular compartment 31 to the compartment 52 whereby the bore 37 communicates with the inner annular or inlet compartment 31. A flange 55 carried by sleeve 30 functions to separate compartment 45 from compartment 52.

In the operation of the device liquid is caused to circulate through the member 3. It is to be understood that the liquid may circulate in either direction but it is preferred that the liquid enter at pipe 34. The liquid entering pipe 34 will pass through the annular inner compartment 31 defined by the sleeves 28 and 30 and will pass through apertures 54 into compartment 52. From the latter compartment the liquid will pass through bushing 50 and into the pipe-lined bore 37 and thence the liquid will split into streams and pass through the cooling recesses 39, bathing the rear faces of the plates 41 and 42 and carrying heat therefrom. The heated liquid then passes inwardly through bore 36 to compartment 45, through openings 48 to compartment 32 and outwardly through pipe 35 to an external pumping and cooling circuit or to a suitable drain.

As mentioned, although the liquid may be circulated in either direction, the circulation described is preferred since the inlet path of the liquid is more restricted, that is, the inner compartment 31, the bushing 50 and pipe-lined bore 37, than the outlet path thereof, that is, bore 36 and the outer annular compartment 32. Hence, the pressure in the entire system is maintained substantially constant.

It can readily be appreciated that heat developed at the contacting surfaces of the clutch facings 43 and 44 with the rings 41 and 42 respectively will be transferred, because of the high heat conduction of the rings 41 and 42, to the liquid circulating in the recesses 39.

As mentioned hereinbefore, the cooled element may be either the driven element or the driving element, as desired. This and other modifications of the invention which do not depart from the spirit of the invention will occur to any one skilled in the art and, hence, it is not intended that the invention be limited to the exact details shown and described except as necessitated by the appended claims.

We claim as our invention:

1. A liquid cooled clutch for power transmission purposes which comprises, a driven member and a driving member, spaced annular friction clutch facings carried by one of said members, the other member comprising a plate disposed between said clutch facings, said plate being provided with annular recesses opening toward opposite clutch facings, a metal ring immovably secured to each opposite face of said plate and serving as closures for said recesses adjacent said clutch facings, means for moving said members toward each other to frictionally engage said clutch facings and said rings to move the driven member with said driving member, and means for circulating a cooling liquid through said annular recesses to cool said rings, said means comprising an inlet and an outlet carried by said plate radially inwardly of said recesses, said plate being provided with angularly spaced bores connecting said inlet and outlet with angularly spaced portions of said recesses.

2. A liquid cooled clutch for power transmission purposes which comprises, a driven member and a driving member, a friction clutch facing carried by one of said members, the other member comprising a plate disposed adjacent said clutch facing, said plate being provided with an annular recess opening in the direction of said clutch facing, a metal ring carried upon said plate and serving as a closure for said recess adjacent said clutch facing, a hub for said plate provided with separate annular compartments, said plate being provided with a radial bore connecting said recess to one of said compartments, said plate being provided with a second radial bore angularly spaced from said first-mentioned bore, said second bore connecting said recess to said second compartment, means for moving said members toward each other to frictionally engage said clutch facing and said ring to move the driven member with said driving member, and means for introducing a cooling liquid into one of said compartments and removing it from the other compartment whereby said liquid circulates through said recess to cool said ring.

3. A liquid cooled clutch for power transmission purposes which comprises, a driven member and a driving member, spaced annular friction clutch facing carried by one of said members, the other member comprising a plate disposed between said clutch facings, said plate being provided with annular recesses opening toward opposite clutch facings, a metal ring carried upon each opposite face of said plate and serving as closures for said recesses adjacent said clutch facings, a hub for said plate provided with separate annular compartments, said plate being provided with a radial bore connecting said recesses to one of said compartments, said plate being provided with a second radial bore angularly spaced from said first-mentioned bore, said second bore connecting said recesses to said second compartment, means for moving said members toward each other to frictionally engage said clutch facings and said rings to move the driven member with said driving member, and means for introducing a cooling liquid into one of said compartments and removing it from the other compartment to circulate said liquid through said recesses to cool said rings.

4. A device as claimed in claim 3 wherein the inlet bore to said recesses is of restricted diameter relative to the diameter of the outlet bore from said recesses.

5. A liquid cooled clutch for power transmission purposes which comprises, a driven member and a driving member, spaced annular friction clutch facings carried by the driving member, the driven member comprising a plate disposed between said clutch facings, said plate being provided with annular recesses opening toward opposite clutch facings, a metal ring carried upon each opposite face of said plate and serving as closures for said recesses adjacent said clutch facings, a hub for said plate provided with separate annular compartments, said plate being provided with a radial bore connecting said recesses to one of said compartments, said plate being provided with a second radial bore angularly spaced from said first-mentioned bore, said second bore connecting said recesses to said second compartment, means for resiliently confining the driven member between the clutch facings of the driving member to frictionally engage said clutch facings and said rings to move the driven member with said driving member, and means for introducing a cooling liquid into one of said compartments and removing it from the other compartment to circulate said liquid through said recesses to cool said rings.

References Cited in the file of this patent

UNITED STATES PATENTS

| | | |
|---|---|---|
| 987,987 | Hinz | Mar. 28, 1911 |
| 2,020,748 | Waseige | Nov. 12, 1935 |
| 2,659,468 | Hobbs | Nov. 17, 1953 |
| 2,664,176 | Whalen | Dec. 29, 1953 |